March 9, 1943.  G. S. CANTACUZENE  2,313,191
PROCESS AND DEVICE FOR STORING LIQUIDS SHELTERED FROM AIR
Filed May 25, 1938  6 Sheets-Sheet 1

INVENTOR:
GEORGES SERVAN CANTACUZENE
BY Haseltine Lake & Co.
ATTORNEYS

March 9, 1943.  G. S. CANTACUZENE  2,313,191
PROCESS AND DEVICE FOR STORING LIQUIDS SHELTERED FROM AIR
Filed May 25, 1938  6 Sheets-Sheet 2

INVENTOR:
GEORGES SERVAN CANTACUZENE
BY Haseltine, Lake & Co.
ATTORNEYS

March 9, 1943. G. S. CANTACUZENE 2,313,191
PROCESS AND DEVICE FOR STORING LIQUIDS SHELTERED FROM AIR
Filed May 25, 1938  6 Sheets-Sheet 3

INVENTOR:
GEORGES SERVAN CANTACUZENE
BY Haseltine, Lake & Co.
ATTORNEYS

March 9, 1943.  G. S. CANTACUZENE  2,313,191
PROCESS AND DEVICE FOR STORING LIQUIDS SHELTERED FROM AIR
Filed May 25, 1938   6 Sheets-Sheet 4

INVENTOR:
GEORGES SERVAN CANTACUZENE
BY Haseltine Lake & Co.
ATTORNEYS

March 9, 1943.  G. S. CANTACUZENE  2,313,191
PROCESS AND DEVICE FOR STORING LIQUIDS SHELTERED FROM AIR
Filed May 25, 1938  6 Sheets-Sheet 5
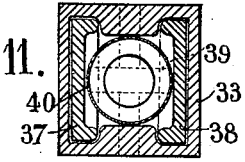
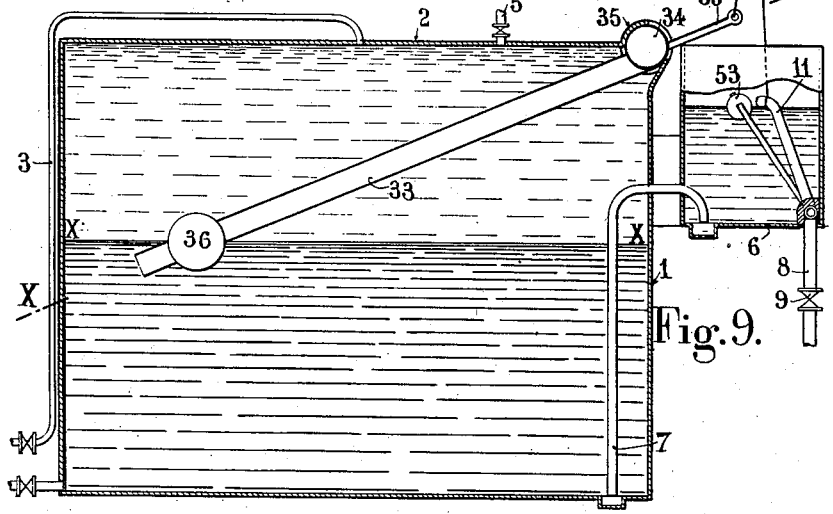
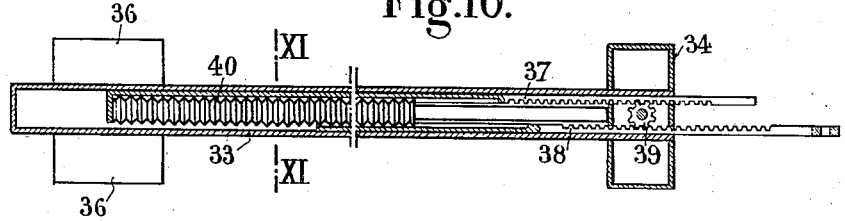
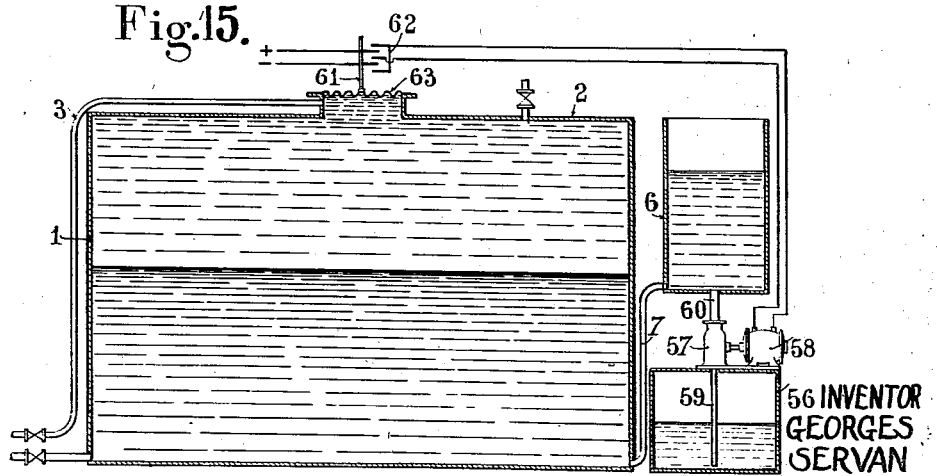
INVENTOR
GEORGES SERVAN CANTACUZENE
BY Haseltine Lake & Co. ATTORNEYS March 9, 1943.  G. S. CANTACUZENE  2,313,191
PROCESS AND DEVICE FOR STORING LIQUIDS SHELTERED FROM AIR
Filed May 25, 1938  6 Sheets-Sheet 6

INVENTOR:
GEORGES SERVAN
CANTACUZENE
BY Haseltine Lake & Co. ATTORNEYS

Patented Mar. 9, 1943

2,313,191

UNITED STATES PATENT OFFICE 2,313,191

PROCESS AND DEVICE FOR STORING LIQUIDS SHELTERED FROM AIR

Georges Servan Cantacuzene, Paris, France; vested in the Alien Property Custodian Application May 25, 1938, Serial No. 209,869
In France January 29, 1938

8 Claims. (Cl. 220—85)

The present invention relates to the storage in a tank and sheltered from air of all liquids and, particularly, of combustible liquid. It more especially concerns tanks of large dimensions.

The tanks or reservoirs which are made of metal or of concrete and serving to store the liquids, contain, when they are not full, air above the liquid. They cannot be completely filled up owing to the fact that the necessary space must be left for the expansion of the liquid when its temperature increases. When filling and emptying said tanks, the difference of volume of the liquid is compensated by an evacuation or an admission of air. Even during the periods when the liquid stored is subjected to no increase and no drawing off, the variations of temperature of the air contained in the tanks results in evacuations and admissions of air. Various inconveniences result therefrom; if the liquid is a volatile liquid, the air in the tank becomes saturated with its fumes which are lost when the air is driven out of the tank; if the liquid is chemically sensitive to the action of the gases constituting the air, a deterioration takes place; the damp air renewed in the tank, as well as the corrosive gases given off by certain liquids, corrode the roof of the metal tank and consequently, the particles of metallic oxide, hydroxide, sulphide, etc. detached from the roof fall on to the bottom of the tank and form thereon galvanic torques which attack this bottom; moreover, the fumes of the liquids which are inflammable and issue from the tank present the danger of explosion and fire.

It has been attempted to remedy some of these inconveniences by the use of floating roofs, inert gases, etc., which is costly and of poor efficiency.

The present invention is adapted to eliminate the inconveniences set forth. It has for object improvements in the processes and tanks for the storage of a liquid and ensuring the maintaining of said liquid rigorously sheltered from air, whether the tank is full or partially filled with this liquid.

The liquid stored is kept in permanent contact with the roof of the tank by an auxiliary liquid which is denser, immiscible with the former liquid and fills up the portion of the tank unoccupied by the liquid to be stored.

The present improvements are particularly adapted to avoid the roof of the tank being subjected to great variations of pressure under the action of the expansion or contraction of the liquids it contains when their temperature varies. In fact, in order that the construction of large tanks should not be of an excessive cost price, it is important that the roof should support only vertical thrusts not exceeding a few grams per square centimeters; it is generally desirable to maintain a very slight upward thrust in order to ensure the permanent contact of the liquid to be stored with the roof.

The invention has particularly for object the combination with a tank of the type specified, of an expansion or compensation vessel which contains a balancing liquid and which communicates with the tank, and with means allowing of raising and lowering in this vessel, the free surface of the balancing liquid, in contact with the atmosphere, between levels such that the hydrostatic pressure transmitted by the various liquids at the surface of the roof remains little different from that supported by the top of this roof whatever may be the variations of volume of said liquids.

Said expansion or compensation vessel can be of variable shape and capacity, it can be placed outside or within the tank, and eventually comprise two or more portions communicating together, one of them serving to supply the other or the others, etc.

Other particular points of the invention will be described with reference to the accompanying drawings given by way of example and which illustrate several forms of construction.

Fig. 9 is a diagrammatic vertical section of an embodiment of the type shown in Fig. 1 and provided with an automatic adjusting device.

Fig. 10 is a longitudinal section made according to line X—X of Fig. 9.

Fig. 11 is a cross section on an enlarged scale made according to line XI—XI of Fig. 10.

Fig. 15 is a diagrammatic vertical section of another tank provided with an automatic adjusting device.

Figure 1:
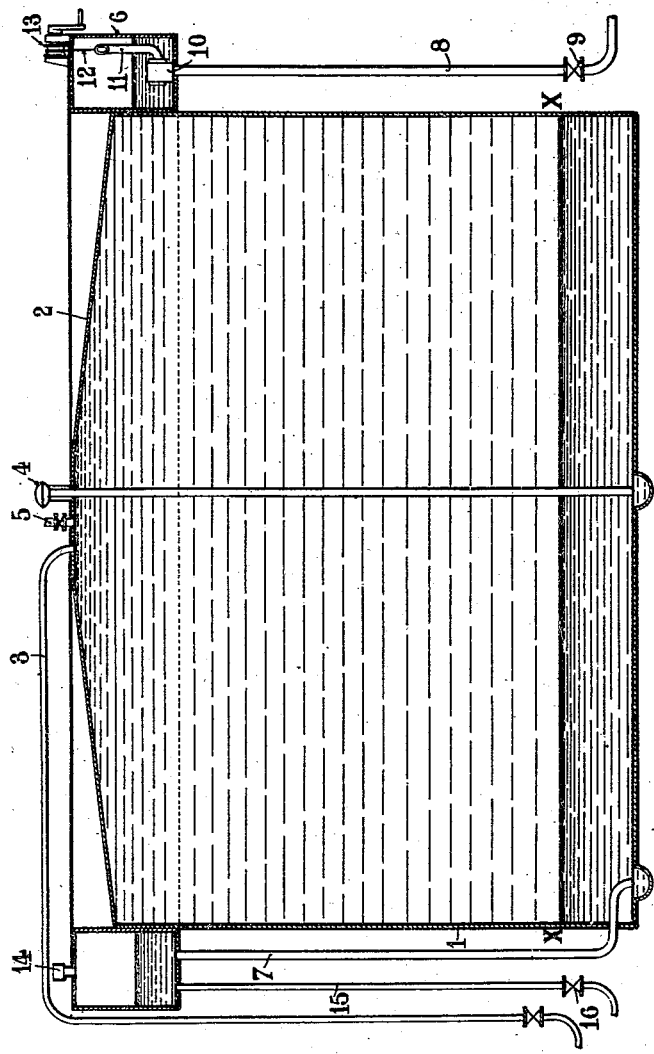
Fig. 1 is a vertical section of a tank provided with an annular expansion vessel.

According to Fig. 1, a sheet metal tank for the storage of gasoline comprises a side wall 1 and a roof 2 at the top of which are arranged a pipe 3 for supplying and drawing off the gasoline, a vent 4 provided with a double-acting valve, adjusted to the maximum and minimum pressures which the tank can support, and a vent having a cock 5.

An annular compensation vessel or vat 6 is secured to the wall 1 and is in communication with the lower part of the tank by a pipe 7; a delivery pipe 8 provided at the bottom of the vat 6 and provided with a cock 9 is connected by a toggle connection 10 to an overflow pipe 11 the height of which is adjustable, for instance by means of a chain 12 and of a winch 13. The vat 6 is in communication with the outside air through a vent 14.

The combination of the compensation vat of appropriate cross section secured at a suitable height and of a vertically adjustable overflow pipe 11, allows, the difference of density of water and gasoline being taken into consideration, of maintaining the pressure under the lower face of the roof 2 between predetermined limits, whatever may be the height of the gasoline in the tank and the density of said gasoline.

The operation is as follows:

The tank 1 and the vat 6 are first of all filled with water; the latter is admitted in the vat through a pipe 15 having a cock 16, and it passes into the tank through the pipe 7; the air escapes through the vents 14 and 5. The overflow pipe 11 is lifted to the maximum in order that the level of the water can rise up to the roof 2.

When the gasoline is introduced in the tank 1 through the pipe 3, the water is driven by said gasoline into the vat 6 and from there, towards the exterior, through the pipe 8. The pipe 11 is lowered in proportion as the level of the gasoline X—X lowers, so that the hydrostatic pressures at this level in the tank and in the tube 7 remain substantially equal.

The tank 1 being filled with gasoline, for instance at an average temperature, the tank should still contain a quantity of water corresponding to the increase of volume of the gasoline under the action of the maximum temperature of the latter. By expanding, the gasoline will drive an equal volume of water into the compensation vat 6 and from there towards the exterior through the overflow 11, the height of the latter being adjusted so as to limit the pressure under the roof 2 to the required value. If, on the contrary, the gasoline cools, its contraction will be compensated by the admission in the tank, through the pipe 7, of a corresponding quantity of water stored in the compensation vat 6.

When the gasoline is drawn off, the water driven off for that purpose, through the pipe 15, in the vat 6, enters, through pipe 7, the tank and drives the gasoline through the pipe 3. Whatever may be the level separating the water and the gasoline in the tank, compensation of the expansions and contractions of the gasoline takes place automatically and the maximum pressure under the roof remains limited to the desired value owing to the adjustment of the overflow pipe 11.

The compensation vat 6 need not be secured to the tank, but it can be mounted, at the required height, at the side of the tank. It can serve for a group of tanks. It can also be secured within the tank, either in the form of a crown along the vertical wall, or as in independent cylindrical reservoir, attached to the roof or supported by the bottom, at the suitable height.

Figure 2:
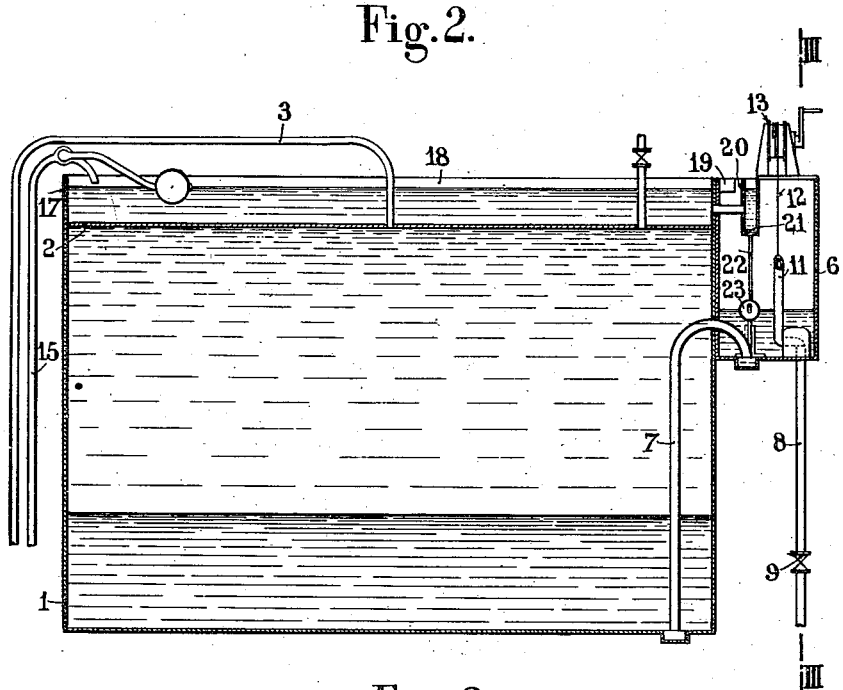
Fig. 2 is a vertical section of a tank provided with a lateral expansion vessel.
Figure 3:
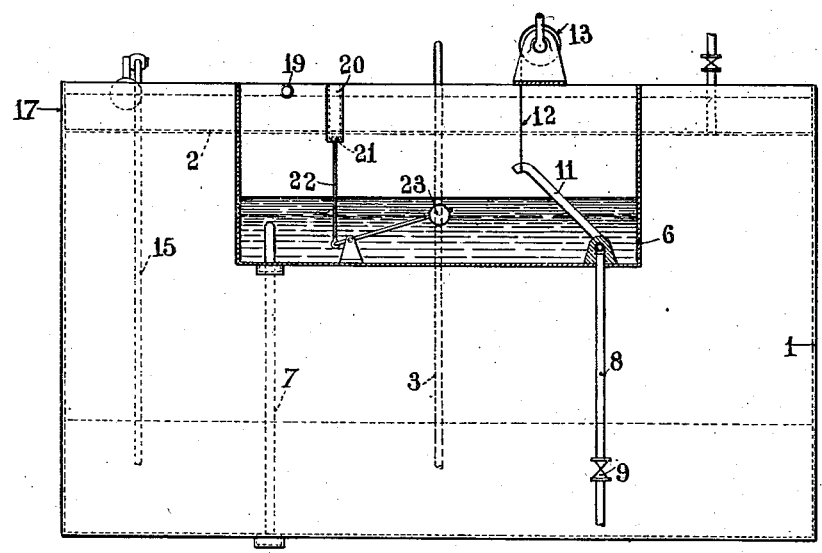
Fig. 3 is a vertical section made according to line III—III of Fig. 2.

In the modification illustrated in Figs. 2 and 3, the roof 2 of the tank 1 is provided with a flange 17 so as to form a basin 18 open to the free air which contains a reserve of compensating water; consequently, the vat 6 can be of reduced volume and economically constructed as a vessel secured at a point of the vertical wall 1, at the height determined by the difference of the densities of gasoline and water. The compensation vessel is constituted by the unit comprising the basin 18 and the vat 6. As in the first form of construction, the bottom of the vat 6 is connected to the bottom of the tank by a pipe 7; the pipe 8 with its adjustable overflow pipe 11 serving to evacuate the water towards the exterior; the drawing off and supply of gasoline take place through the pipe 3, and the water is poured, no longer directly into the vat 6, but in the basin 18 through the pipe 15; the overflow from the basin 18 flows through a pipe 19 into the vat 6; at 20 is provided a nozzle with a valve 21 which feeds the vat 6 when said valve is lifted through the medium of a rod 22 under the action of a lever provided with a float 23, that is to say, when the lowering level of the water in the vat 6 reaches a certain distance above the upper orifice of pipe 7.

For filling the tank with water, the latter is delivered through pipe 15 into the basin 18, which water flows into the vat 6 and subsequently passes into the tank, the valve 9 of pipe 8 being closed.

For filling the tank with gasoline, valve 9 being open, the gasoline is delivered through pipe 3; said gasoline drives the water from the tank 1 through the pipe 7 into the vat 6 and, through the overflow 11 and the pipe 8, towards the exterior.

The outflow of the gasoline through pipe 3 is adjusted so as not to exceed that of pipes 11 and 8, in order that the level of the water in the vat 6 should not unduly rise.

Whatever may be the lower level of the gasoline in the tank, the pipe 11 can be adjusted so as to balance the hydrostatic pressures at this level with the required approximation, the level of the water in the basin 18 and the maximum thrust which the roof 2 can support being taken into account. The valve 21 controlled by the float lever 23 is a safety device preventing the air from entering the tank through the pipe 7 when the lower level of the gasoline rises in said tank by its contraction through the effect of cooling.

Figure 4:
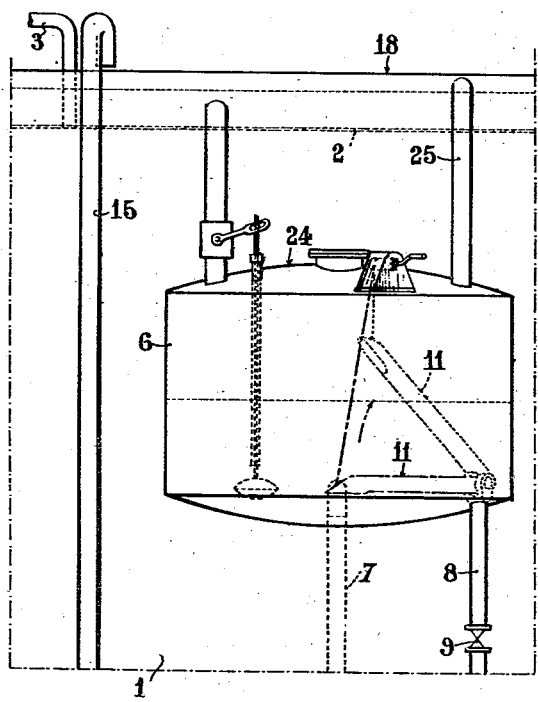
Fig. 4 is a partial front elevation of another tank having a lateral expansion vessel.
Figure 6:
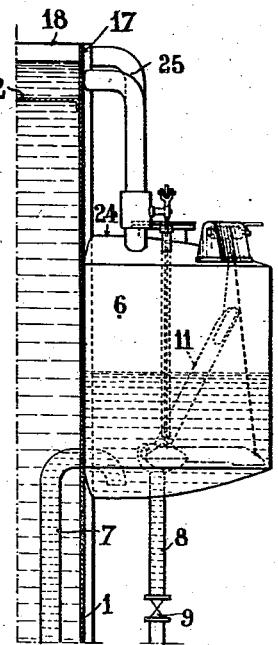
Figs. 5 and 6 are a partial plan view and a vertical section made according to line VI—VI of Fig. 5.
Figure 5:
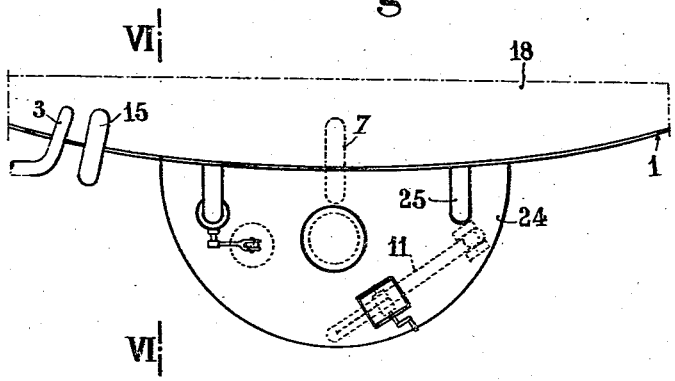

The modification shown in Figs. 4, 5, 6 is distinguished by the fact that the compensation vat 6 is closed at the top by a fluid-tight roof 24.

The parts corresponding to those described above are designated by the same reference numerals.

This modification is economical as it allows of reducing the height of the vat 6. When the tank 1 is completely filled with water, the pressure of the latter is balanced by the column of water rising in a conduit 25 leading from the upper part of the vat 6 and opening in the upper part of the basin 18 so as to thus serve as overflow for the latter.

Figure 7:
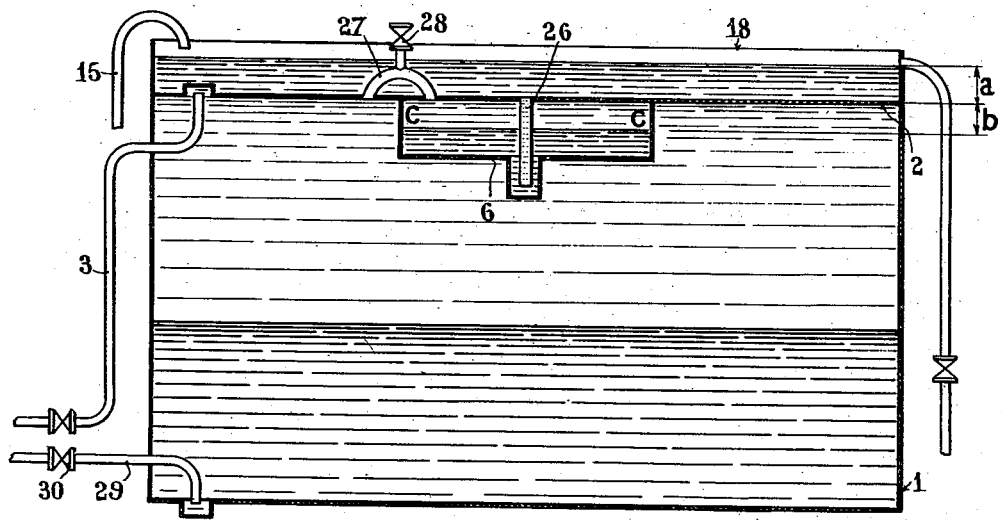
Figs. 7 and 8 are vertical sections of two other modifications.

Another embodiment of the invention is diagrammatically illustrated in Fig. 7.

The compensation vat 6 is, in this case, placed within the reservoir or tank 1. It is secured in a fluid-tight manner under the roof 2, which is surmounted by a water basin 18. The latter communicates with the low point of vat 6 through a pipe 26. The upper part of vat 6 communicates with the upper part of tank 1 through a bent pipe 27 provided with an air exhaust valve 28. The water is supplied to and drawn off directly from the bottom of the tank 1 through a pipe 29 provided with a cock 30.

In this embodiment, the mass of water serving to support the gasoline and introduced through pipe 29 is independent from that contained in the vat 6, the latter, with the reserve of basin 18 alone ensuring the compensation of the variations of volume of the gasoline under the action of the temperature. Consequently, the height of the compensation vat above the bottom of the tank 1 is then independent from the height of said tank and from the difference of density of water and gasoline.

The tank 1 having been filled with water through the pipe 29, it is then filled with gasoline by driving the latter through the pipe 3 at a given rate of flow; water is simultaneously evacuated through pipe 29 at the same rate of flow; reversely, for drawing off gasoline, at a given rate of flow, through pipe 3, water is simultaneously driven out through pipe 29 at the same rate of flow.

The differences which could take place between the simultaneous outflows of these two liquids are compensated by exchanges of water and gasoline which take place between the tank 1 and the vat 6 and exchanges of water between the vat 6 and the basin 18, respectively through pipes 27 and 26.

The roof 2 is subjected to a downward thrust corresponding to the height of water $a$ contained in the basin 18 and to an upward thrust corresponding to this same height of water $a$ increased to the extent of the height of water $b$ comprised between said roof and the surface $c$—$c$ separating the water and the gasoline in the vat 6, and reduced to the extent of the thrust corresponding to the height of gasoline $b$ in said vat. The resultant thrust is therefore equal to $b(D-d)$. If $D$ and $d$ designate the densities of water and of gasoline at the actual temperature; its value therefore depends on the maximum variation of $b$ and, consequently, on the height given to the vat 6, so that it is easy to determine beforehand the maximum stresses supported by the roof 2.

Figure 8:
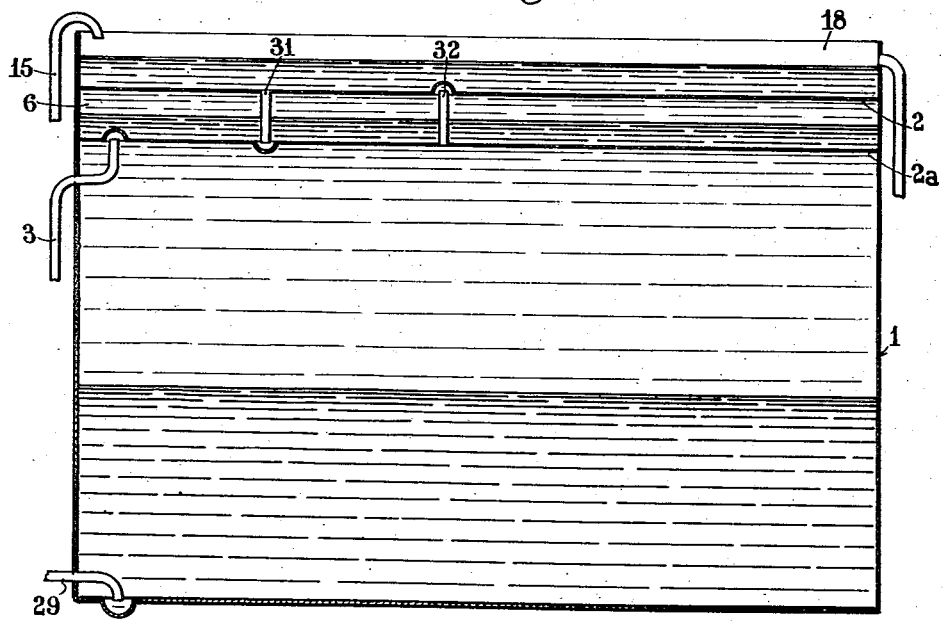

In the embodiment diagrammatically illustrated in Fig. 8, the roof 2 is again surmounted by a basin 18 and the compensation vessel 6 is arranged within the tank 1, but it extends on all the horizontal cross section of said tank; its bottom 2a thus constitutes a second roof located lower than 2 and at an interval which determines between both, a volume equal to that which is left in actual gasoline tanks, when they are filled up. This capacity 6 is fluid-tight and connected, on the one hand, at a low point, to the basin 18 by a pipe 31 and, on the other, at a high point, to the tank 1 by a pipe 32. The gasoline driven out of the tank towards the vat 6 therefore collects under the upper roof 2, whilst the water occupies the bottom. The capacity of the basin 18 is at least equal to that of the compensation space comprised between both roofs 2 and 2a.

In the forms of construction illustrated in Figs. 1 to 6, the adjustment of the position of the overflow pipe 11 is assumed to be effected by hand according to the indications which may be given by suitable accessory apparatus, level indicators, pressure-gauges, thermometers, etc.

However, it is possible to obtain this adjustment automatically through the effect of variations of temperature and variations of the volume of gasoline by charging or by extraction.

By way of example, Fig. 9 diagrammatically illustrates a tank with an outer compensation vat of the type of Fig. 1 or 2 and provided with a device for automatically adjusting the level of the overflow orifice by the rotation of tube 11 upwardly or downwardly. This device (Figs. 9, 10, 11) comprises a long hollow slide 33 the lower end of which is closed and the upper end of which is provided with a cylindrical head 34 pivoting in a fluid-tight manner in a shell 35 rigid with the wall of tank 1 and placed on a level with the roof 2. This slide is weighted and provided with floats 36 so that the latter hold themselves on the surface X—X separating the gasoline and the water.

Within this slide are guided two slide-blocks 37, 38 cut out as racks and coupled by a pinion 39 pivoting in the head 34 of the slide so that these two slide-blocks move in reverse directions.

Between these slide-blocks is placed an expansible element 40 consisting, for instance, in a tube filled with a suitable liquid, a portion of which at least is of undulated shape so as to be capable of being stretched and which is secured at the top to the slide 33, near its upper end, and at the bottom to the lower end of the slide-block 37.

It results therefrom that the slide-block 37 is moved towards the lower end of the slide when the temperature rises and causes the element 40 to expand; the slide-block 38 is moved to an equal distance in the reverse direction. Lowering of the temperature produces reverse displacements.

The outer end of the slide-block 38 is connected to the movable end of the overflow pipe 11 by a cable 41 passing over a pulley 42 which pivots on a frame (not shown) so that the vertical displacements of the end of the slide-block 38 are transmitted to the end of the pipe 11, in the same magnitude, but in reverse direction.

Figure 12:
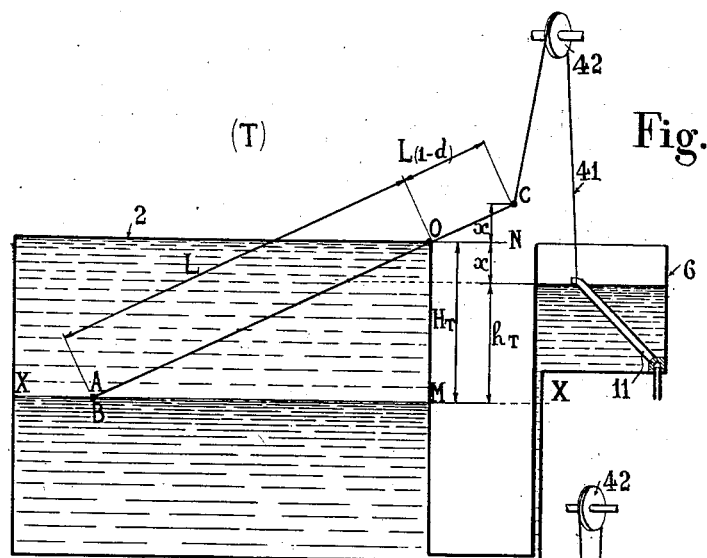
Figs. 12, 13, 14 are diagrams relating to this adjusting device.
Figure 13:
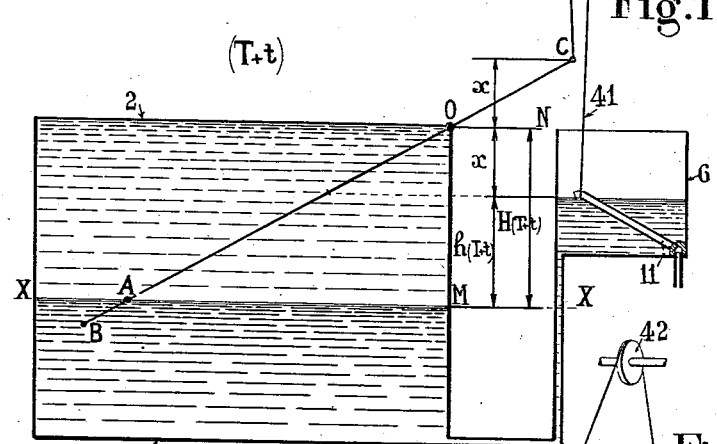
Figure 14:
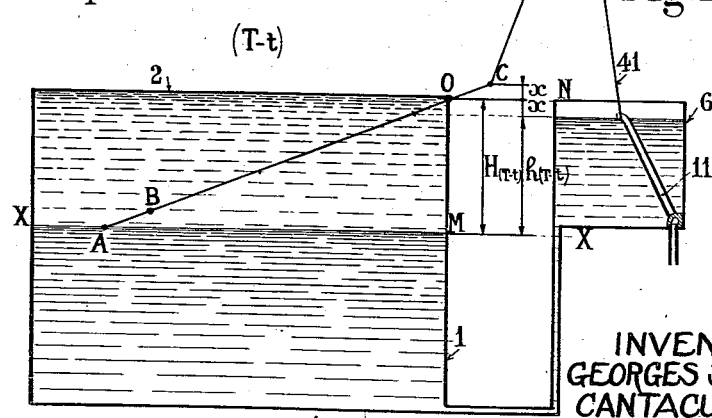

The operation of this device is indicated in Figs. 12, 13, 14 in which X—X indicates the level of the surface separating the water and the gasoline. H is the height of the gasoline, $h$ the height of the water in the compensation vat, $x$ indicates the distance between said water and the level of the roof 2, L is the length comprised between the pivotal axis O of the slide 33 and the axis A of the floats 36.

The whole being at average temperature T (Fig. 12), the united ends B of element 40 and of slide-block 37 are at right angles to the axis A and the outer end C of the slide-block 38 is at a distance from the axis O equal to $L(1-d)$, $d$ designating the density of the gasoline at the average temperature T relatively to that of water at the same temperature.

By reason of the similitude of the triangles OAM and OCN, one obtains $$\frac{CN}{OM} = \frac{OC}{OA}$$

therefore $$CN = H\frac{L(1-d)}{L} = H(1-d)$$

The length of the cable 41 is so adjusted that the orifice of the pipe 11 is lowered below the roof 2 to the same distance as the end C is raised above said roof.

In these conditions, $x=H(1-d)$, and consequently $h=Hd$, so that hydrostatic equilibrium is obtained at the level X—X. The upward pressure of the gasoline under the roof 2 is then equal to atmospheric pressure acting downwardly on the latter.

If a further quantity of gasoline is introduced in the tank, without the average temperature T changing, a flow of water takes place through the vat 6 and through the pipe 11, and at the same time as the level X—X lowers, the slide 33 rotates about the axis O, the end C rises and the overflow orifice lowers. At every instant the distance $x$ remains equal to the increasing quantity $H(1-d)$, and $h$ remains equal to $Hd$, so that hydrostatic equilibrium is maintained and no thrust is exerted on the roof 2.

On the other hand, if the temperature of the liquid mass should vary, from T to $(T \pm t)$, the expansible element 40 lengthens or shortens according to a length $AB=L.F(t)$ and the slide-blocks 37, 38 are moved to the same distance.

If the temperature has risen (Fig. 13) the level X—X and the point A are lowered below the roof to a distance $$H_{(T+t)}=H_T[1+f(t)]$$

Moreover, the point B is spaced from A to a distance $AB=L.F(t)$. The point C is thus spaced from O to a distance $$OC=L[1-d+F(t)]$$

It results from the similitude of the triangles that $$\frac{x_{(T+t)}}{H_{(T+t)}}=\frac{1-d+F(t)}{1}$$

therefore $$x_{(T+t)}=H_T[1+f(t)][1-d+F(t)]$$

and $$h_{(T+t)}=H_{(T+t)}-x_{(T+t)}=$$
$$H_Td+H_T[f(t)d-F(t)(1+f(t)]$$

Now $H_Td$ is the pressure corresponding to the weight of the gasoline on the surface of level X—X and $h_{(T+t)}$ is the pressure corresponding to the weight of the water on the same surface, it being admitted that the density of the water or other balancing liquid does not appreciably vary between the limits of temperature considered. In order that hydrostatic equilibrium should not be disturbed owing to the expansion of the gasoline or other liquid to be stored, it is consequently necessary that $$df(t)=F(t)(1+ft)$$

In practice, the expansible element 40 can be filled with a suitably chosen liquid so that the above equality should be approximately satisfied between the temperature limits admitted $T+t$ and $T-t$, the variation of pressure on the roof 2 of the tank not exceeding the limit imposed for safety.

The contraction of the gasoline by cooling below T leads to the same result as above indicated; but it is to be noted that for maintaining the required equilibrium, it is necessary that the level of the water in the vat 6 should follow the displacements of the overflow pipe 11 as well upwards as downwards; therefore water must be introduced in the vat 6 in proportion as the pipe 11 rises. This introduction can be automatically obtained for instance, by means of a device according to Fig. 15 which diagrammatically illustrates a tank 1 communicating by a pipe 7 with a vat 6 in which the level of the water automatically varies so as to maintain constant the pressure of the gasoline under the roof 2. This vat communicates with a basin 56 through the medium of a pump 57 actuated by an electric motor 58 and which can sometimes sucks the water from the basin through a conduit 59 and delivers it through a conduit 60 into the vat, and sometimes causes the water to pass from the vat to the basin, according to the direction of rotation of the pump. The reversing of the motor 58 is obtained by means of a reversing switch 61, 62 the movable part 61 of which is connected to a distortable part of the roof 2, constituted for instance by corrugated sheet metal 63, whilst the fixed part 62 is carried by a member of the framework, not shown. When the pressure of the gasoline under the roof 2 and the sheet metal 63 has the required value, the current does not pass and the pump is stopped. As soon as the pressure increases, the switch 61, 62 causes current to pass through the motor in such a direction that the pump causes the level of the water in the vat 6 to lower, which reduces to the corresponding extent the pressure in the tank. Reversely, when the pressure lowers in the tank, the switch is actuated in the reverse direction by the sheet metal 63 and the motor causes the pump to rotate for causing the level of the water in the vat 6 to rise. The pressure under the roof 2 is thus maintained within the required limits so that safety should never be imperilled.

It is to be understood that the forms of construction above described have been given by way of indication only and could receive any desirable constructional modifications without departing thereby from the scope of the invention.

Moreover, gasoline and water have been chosen in the examples described as stored and auxiliary liquids; but it is obvious that the process and the device according to the invention are applicable to all liquids to be stored, it is simply necessary that the auxiliary liquid should be denser and immiscible with the liquid stored.

Having now fully described my invention, I claim:

1. A process for storing a liquid on a mass of denser liquid in a completely closed tank having at its highest point inlet means and outlet means for the liquid to be stored and the bottom of which communicates with a compensating receiver open to the atmosphere, which consists in maintaining in said compensating receiver the level of the denser liquid at a height below the roof of the tank sufficient to hold the liquid to be stored in contact with the roof of the tank and cause the same to exert on the latter a very slight upward thrust, substantially equal to the downward thrust to which said roof is subjected.

2. A process for storing a liquid less dense than water on a mass of water in a completely closed tank having at its highest point inlet means and outlet means for the liquid to be stored and the bottom of which communicates with a compensating receiver open to the atmosphere, which consists in maintaining in said compensating receiver the level of the water at a lower level than that of the roof of said tank and in causing said level to vary according to the quantity of liquid stored in order to hold said liquid to be stored in contact with the roof of the tank and cause the same to exert on the latter a very slight upward thrust, substantially equal to the downward thrust to which the roof is subjected.

3. A process for storing a liquid less dense than water on a mass of water in a completely closed tank having at its highest point inlet means and outlet means for the liquid to be stored and the bottom of which communicates with a compensating receiver open to the atmosphere, which consists in maintaining in said compensating receiver the level of the water at a lower level than that of the roof of said tank and in adding and removing water from said vessel according to the quantity of liquid stored in order to hold said liquid to be stored in contact with the roof of the tank and cause the same to exert on the latter a very slight upward thrust substantially equal to the downward thrust to which said roof is subjected.

4. A tank closed by a fluid-tight roof and intended to be completely filled with water and with a liquid less dense than water, in combination with a compensating receiver the top of which communicates with the atmosphere and the bottom with the bottom of said tank, means for introducing and for extracting said less dense liquid at the upper part of said tank and means for maintaining in said compensating receiver the level of the denser liquid at a height lower than that of the upper part of the roof, in order to hold the liquid to be stored in contact with the roof of the tank and cause the same to exert on the latter a very slight upward thrust, substantially equal to the downward thrust to which said roof is subjected.

5. A tank closed by a fluid-tight roof and intended to be completely filled with water and with a liquid less dense than water, in combination with a compensating receiver the top of which communicates with the atmosphere and the bottom with the bottom of said tank, means for introducing and for extracting said less dense liquid at the upper part of said tank, means for altering the level of the water in said compensating receiver, a motor pump unit for actuating said means for altering the level of the water in said compensating receiver, a reserve vessel into which said motor pump unit delivers the water coming from said compensating receiver by sucking the water to be delivered into said compensating receiver, means distortable under the action of the pressure exerted by the less dense liquid on the underside of said roof and a reversing switch actuated by said distortable means and inserted in the electric circuit of said motor pump unit.

6. A tank as claimed in claim 4, in combination with a vessel for a reserve of water open to the atmosphere and covering said tank, a valve controlled by a float and adapted to cause said vessel to communicate with the compensation receiver when the level in said receiver falls below a minimum predetermined level, a discharge overflow pipe movable in said receiver, and means controlled by hand for raising and lowering the inlet end of said discharge pipe.

7. A tank closed by a fluid-tight roof and adapted to be filled with water and with a liquid less dense than water, in combination with a compensation receiver secured on one side of said tank, a reserve vessel open to the atmosphere and covering said tank, means for introducing said liquid less dense than water in said tank and for extracting it therefrom, means for introducing water in said reserve vessel, a conduit for evacuating the overflow from said vessel into said compensation receiver, the latter communicating at the top with the atmosphere and at the bottom with the lower part of said tank, a conduit having a valve for conveying the water from said reserve vessel into said compensation receiver, a float in said receiver and connected to said valve so as to allow the water of the vessel to flow as long as the level in said receiver is below a predetermined limit, a discharge overflow pipe the inlet end of which opens into said compensation receiver and means for raising and lowering said end of said overflow pipe.

8. A tank closed by a fluid-tight roof and adapted to be entirely filled up with water and with a liquid less dense than water, in combination with a compensation receiver having a top which communicates with the atmosphere and having the lower portion thereof communicating with the lower portion of said tank, means for introducing said liquid less dense than water in said tank and for extracting it therefrom, and level changing means for raising and lowering the level of the water in said compensation receiver so that the hydrostatic pressure transmitted by the liquids to the lower surface of the roof of the tank remains but slightly different from the pressure supported by the upper surface of said roof whatever may be the variations of volume and of density of the liquids, said level changing means including a pump actuated by an electric motor, having the suction pipe thereof immersed in a mass of water contained in a reserve vessel and having the delivery pipe of the same connected to said compensation receiver, and an electric reversing switch inserted in the circuit of said electric motor and having a movable element connected to a distortable part of the roof of said tank.

GEORGES SERVAN CANTACUZENE.